United States Patent [19]

Polackowyj

[11] Patent Number: 5,338,383
[45] Date of Patent: Aug. 16, 1994

[54] TANK INSULATION METHOD WITH CRYOGENIC EXPOSURE

[75] Inventor: John Polackowyj, Fair Oaks, Calif.

[73] Assignee: Aerojet General Corporation, Rancho Cordova, Calif.

[21] Appl. No.: 879,783

[22] Filed: May 6, 1992

[51] Int. Cl.⁵ ............................................. B29C 65/00
[52] U.S. Cl. ........................................ 156/80; 156/91; 156/287; 156/305; 220/453; 220/457; 220/470; 220/562; 220/586; 428/34.5
[58] Field of Search .................. 156/80, 91, 287, 305; 220/453, 562, 457, 586, 470; 62/62; 428/34.5

[56] References Cited

U.S. PATENT DOCUMENTS

| | | | |
|---|---|---|---|
| 3,100,171 | 8/1963 | Hardesty | 156/287 |
| 4,391,924 | 7/1983 | Uram, Jr. | |
| 4,452,279 | 6/1984 | Atwell | 428/34.5 |
| 4,567,076 | 1/1986 | Therrien | |
| 4,600,634 | 7/1986 | Langer | |
| 4,757,917 | 7/1988 | Gleich et al. | |
| 4,767,656 | 8/1988 | Chee et al. | |
| 4,774,118 | 9/1988 | Davis et al. | |
| 4,926,963 | 5/1990 | Snyder et al. | |
| 4,961,989 | 10/1990 | Grimwood | |

OTHER PUBLICATIONS

Johnson et al., "Properties of Nexel 480 Ceramic Fibers", *Ceram. Eng. Sci. Proc.*, 8:744–754 (1987).

*Primary Examiner*—John J. Gallagher
*Attorney, Agent, or Firm*—Townsend and Townsend Khourie and Crew

[57] ABSTRACT

A ceramic fiber fabric such as an alumino-boro-silicate fabric is impregnated with a silicone elastomer to form a composite material. The fabric may be reinforced with hoops or rings to provide a free-standing insulation. The insulation is attached to the wall of a tank. The tank may be subjected to cryogenic temperatures such as during a cryostretch tank formation procedure, without cracking or spalling the insulation. The insulated tank can withstand exposure of elevated temperatures such as about 2000° F.

9 Claims, 4 Drawing Sheets

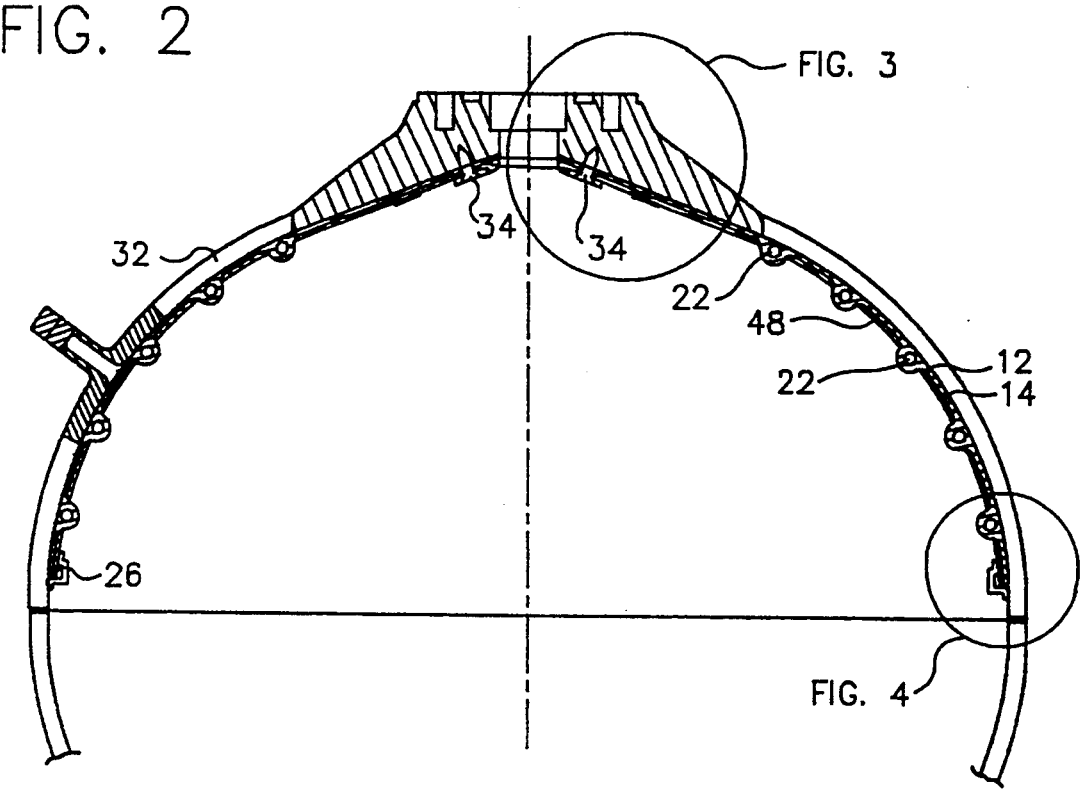
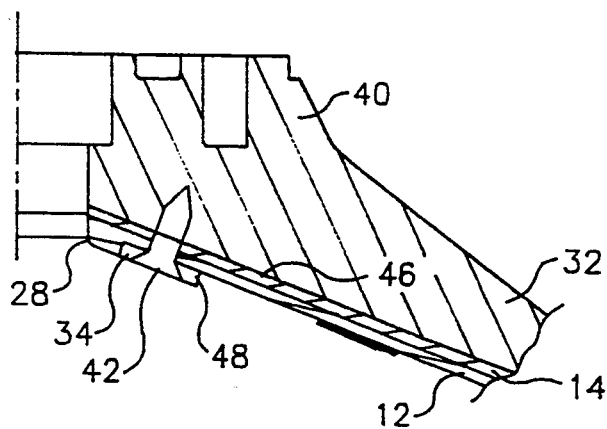
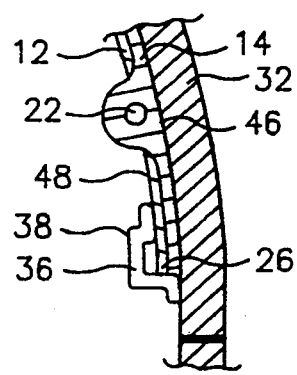

TANK INSULATION METHOD WITH CRYOGENIC EXPOSURE

The present invention relates to a method and apparatus for providing insulation to a propellant tank and in particular to propellant tank insulation which can withstand both cryogenic and elevated temperatures.

BACKGROUND OF THE INVENTION

Certain types of pressure vessels are intended for exposure to elevated temperatures and require insulation during the elevated temperature use. For example, propellant positive expulsion tanks such as those used in the space shuttle and other liquid rocket vehicles, may be exposed to temperatures in excess of around 2000° F. (about 1100° C.) such as from pressurant gas during operation However, insulation attached to the tank will, at least in some applications, also be exposed to cryogenic temperatures during fabrication. ...For example, during a so-called "cryo-stretch" cycle, provision and positioning of suitable materials has been particularly difficult when the insulation is on a tank interior wall. In at least one tank configuration, the tank design is such that internal insulation must be applied to the tank wall prior to cryogenic pressurization. The tank may be filled with a pressurized cryogenic fluid and thus may be exposed to temperatures of about −320° F. (about −200° C.) or less. Previous materials which have been attempted for this purpose have generally been unable to survive cryogenic temperature exposure under pressure without unacceptable damage. Damage such as cracking of the insulated material and spalling has been observed. Cracking and spalling exposes at least portions of the tank in a substantially uninsulated condition. Accordingly, it would be advantageous to provide an insulation material for a tank which can withstand exposure both to pressurized cryogenic fluids and to gas at elevated temperatures.

SUMMARY OF THE INVENTION

The present invention provides tank insulation which includes a ceramic fiber material impregnated with an elastomer material. According to one embodiment, a fabric fashioned from alumino-boro-silicate ceramic fibers is formed into the desired shape such as by sewing and attachment to supporting structures such as wire hoops. This prefabricated ceramic fiber "bag" is positioned on or in the tank. It may be mechanically attached such as by attaching a split ring connector to a girth cuff and/or clamping using one or more retaining rings. The fiber is impregnated with an elastomer such as by being wetted-out with a silicone substance such as methyl-phenyl silicone or dimethyl silicone to form a composite. The tank is pressurized with a cryogenic fluid, cooling the insulation material to about −200° F., preferably down to about −320° F. (200° C.) or less. During use the insulation is exposed to elevated temperatures such as a temperature of about 1000° F., (about 530° C.) up to about 2000° F. (about 1100° C.) or more, such as by exposure to pressurized, heated gas.

BRIEF DESCRIPTION OF THE DRAWINGS

FIG. 2 is a cross-sectional view of a tank having insulation installed according to an embodiment of the present invention;

FIG. 3 is an enlarged cross-sectioned view of region 3—3 of FIG. 2;

FIG. 4 is an enlarged cross-sectioned view of region 4—4 of FIG. 2;

DESCRIPTION OF THE PREFERRED EMBODIMENT

Figure 1:
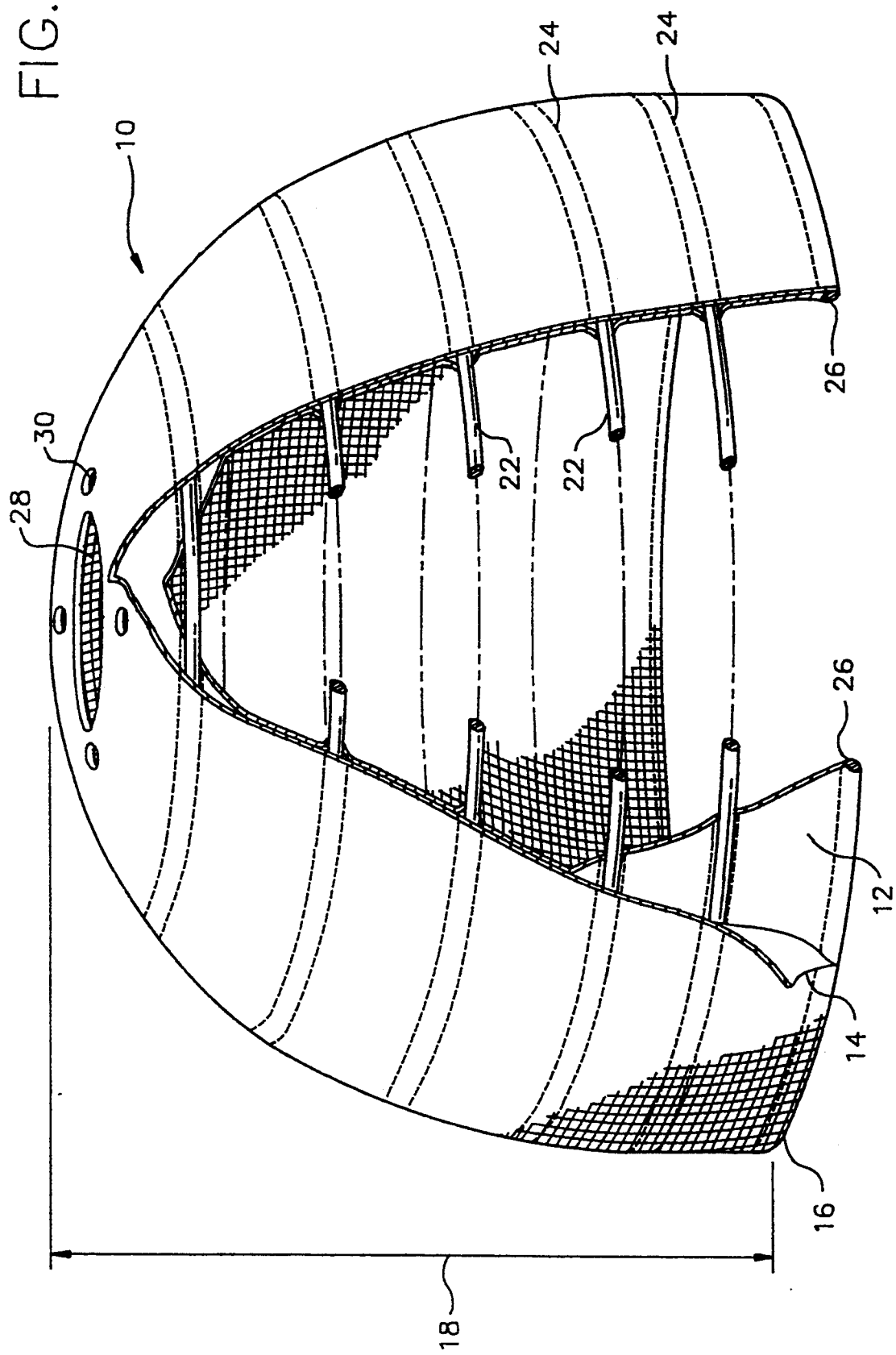
FIG. 1 depicts a free standing insulation device according to one embodiment of the present invention.

As seen in FIG. 1, according to one embodiment of the invention, the insulation 10 is provided in a free-standing form. In the depicted embodiment, the insulation is provided by sewing together inner and outer layers, 12, 14 of a ceramic fiber material. Each layer of the ceramic fabric 12, 14 in the embodiment of FIG. 1, is about 0.03 inches thick (about 0.75 millimeters). Preferably, the ceramic fabric is a material which remains flexible at cryogenic temperatures such as −320° F. According to one embodiment, the fabric is woven from alumino-boro-silicate ceramic fibers such as the ceramic available under the trade name Nextel TM preferably Nextel AF-30, available from 3M Company, St. Paul, Minn. In the embodiment depicted in FIG. 1, the insulation 10 is intended to be used in connection with a substantially hemispherical tank head and thus the layers 12, 14 are cut and sewn, such as by using Nylon TM or Nextel TM thread, to fit the tank contour as depicted in FIG. 1. In the embodiment of FIG. 1, the height 18 of the insulation 10 is approximately 6.6 inches (about 16.8 cm) and the diameter at the base, 20, as approximately 11.75 inches (approximately 30 cm). Preferably, the fabric weave direction, defined by the warp and woof direction of the fabric is positioned at about 45° to the vertical (defines a projection at 45° to the tank axis) 16 as depicted in FIG. 1.

To assist in providing insulation 10 which is free-standing, supporting hoop rings 22 are positioned between the layers 12, 14 and held in place by pockets formed by stitching 24. The wire hoops, according to one embodiment of the invention, are formed of a corrosion resistant alloy such as a nickel and chromium alloy, e.g. the material sold under the trade name Inconel®, available from Huntington Alloy Products Division Of International Nickel Company, Inc. In one embodiment, the wire is a 0.047 inch (about 1.2 mm) diameter wire. A thickened cuff region 26, such as may be formed from extra layers of fabric, is provided to assist in attaching the insulation to the tank as described more fully below. A hole 28 at the apex accommodates a tank fill/exit tube. One or more mounting holes 30 may be formed in the insulation 10 to accommodate mounting hardware as described more fully below.

The dry ceramic fiber insulation 10 is positioned in the desired location with respect to the tank 32 as shown in FIG. 2. In one embodiment, the tank 32 is formed of steel. The insulation 10 can be attached to the tank 32 mechanically, or using a layer of bonding material or both. In the embodiment depicted in FIG. 2, mechanical attachment is by way of a retaining ring 34 (FIG. 3) and a split ring attachment 36, 38 (FIG. 4). As shown in FIG. 3, the retaining ring 34 may be attached to a portion of the tank 32, such as a tank boss region 40 by one or more coupling devices such as screws 42 accommodated in the holes 30 noted above. Other attachment devices such as rivets, pins, clamps and the like are also possible.

As shown in FIG. 4, the cuff 26 is contained within a pocket formed by a split ring connector formed of a lower ring 36 and an upper ring 38. The lower and upper rings 36, 38 are connected together, such as by using screws, bolts, soldering, brazing, welding and the like, to form the pocket which holds the cuff 26 in the desired position.

In the depicted embodiment, a bonding layer 46 between the insulation 10 and the tank 32 is provided. In the depicted embodiment, the bonding layer is approximately 0.01 inches thick (about 0.25 mm). Preferably the elastomer is of a type which does not require oven curing such as a type which is room temperature vulcanizing. The bonding layer 46 is preferably formed of a silicone elastomer material. Examples include a methylphenyl silicone and dimethyl silicone. In one embodiment, the silicone elastomer is a material sold under the trade mark RTV by General Electric Company, Polymers Product Department. According to one embodiment, the silicone elastomer is RTV 560 available from General Electric Company, Waterford, N.Y.

The dry ceramic fabric 12, 14 is wetted with a silicone elastomer, preferably the same elastomer described above for the bonding layer (if used). In one embodiment, the wetting out of the fabric is done after the dry fabric is positioned adjacent the tank. Preferably the bonding layer is laid down at about the same time the dry fabric is wetted-out. In the embodiment depicted, a coating layer of silicone elastomer is formed on the exposed surface of the insulation. This coating layer 48 (if used) is preferably formed of the same material used for the wetting out the dry fabric and, in the preferred embodiment, is approximately 0.01 inches (about 0.25 millimeters) thick. The coating layer 48 is preferably formed at about the same time that the wetting-out is performed.

Figure 5:
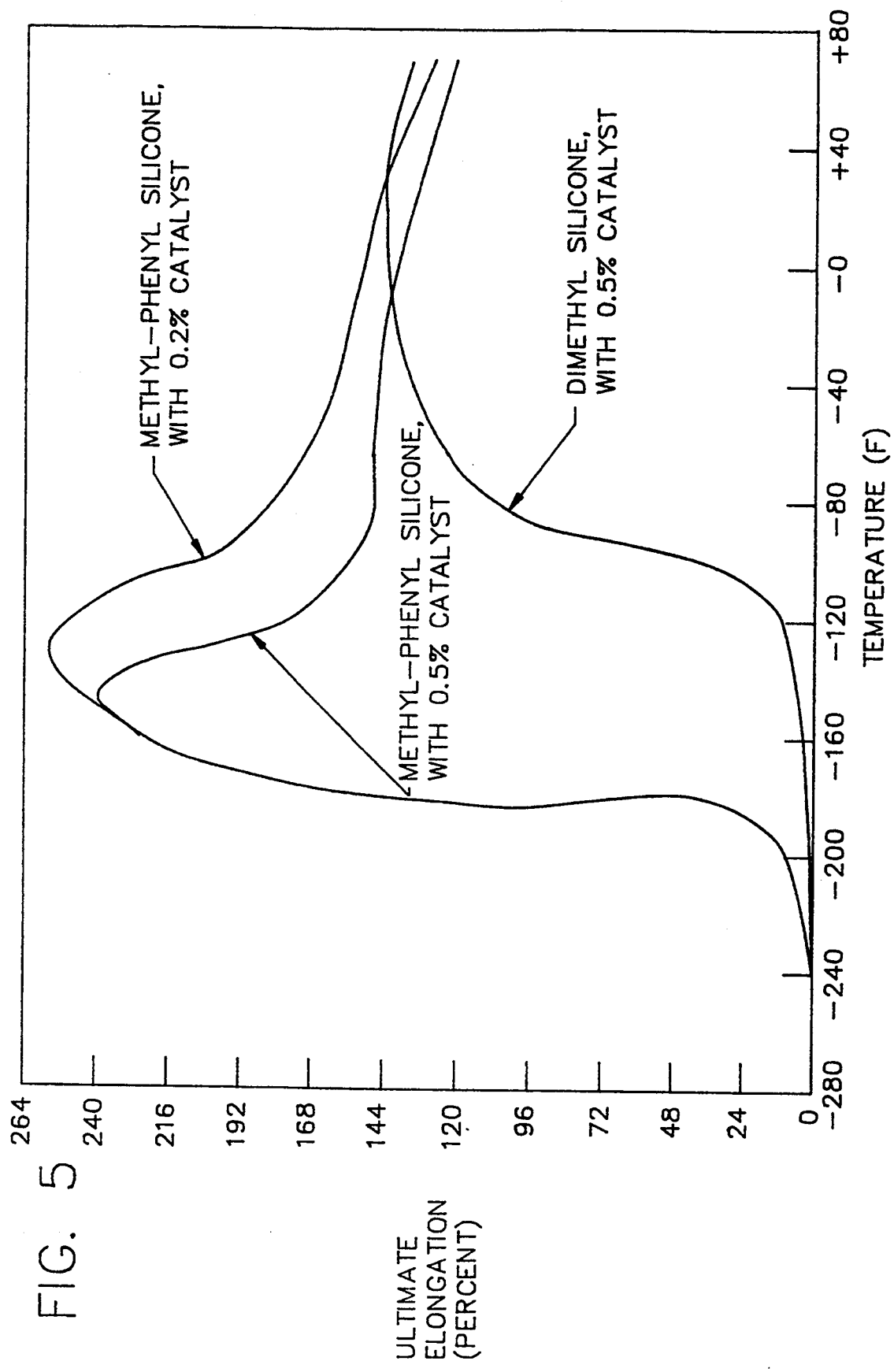
FIG. 5 depicts the temperature-dependent elongation of silicone materials.
Figure 6:
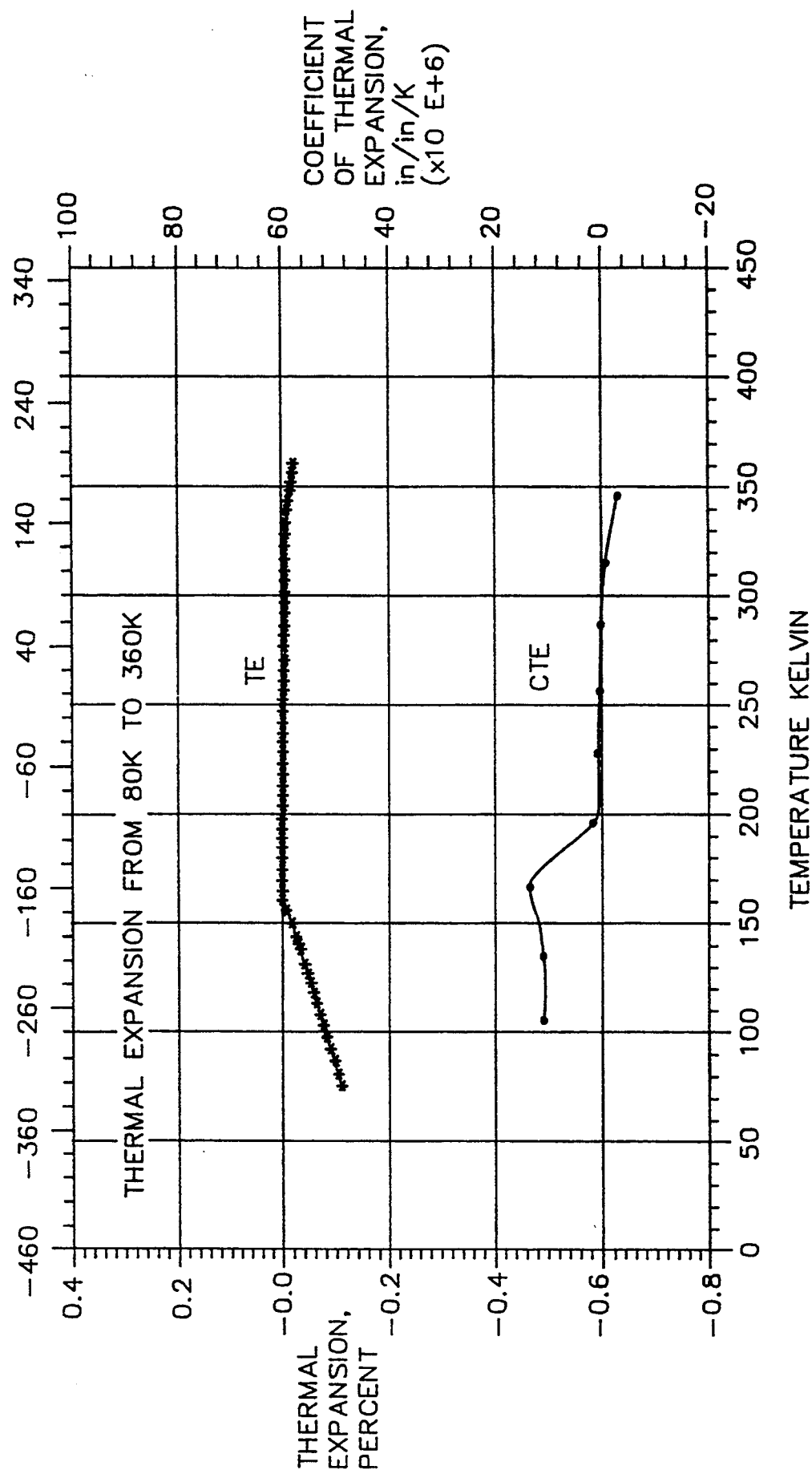
FIG. 6 depicts percent thermal expansion and coefficient of thermal expansion of elastomer impregnated ceramic fiber material, according to an embodiment of the present invention.

The combination of the dry fabric and the vulcanized elastomer produces a composite material. The components of the composite material (the ceramic fiber and the elastomer) are selected such that the insulation 10 is able to withstand both cryogenic temperatures and elevated temperatures after being attached to the tank 32 without substantial cracking or spalling. Preferably the composite material has a thermal expansion at cryogenic temperatures which is a close match to that of the tank material. FIG. 5 depicts percent elongation for several types of silicone (i.e. in the absence of ceramic fabric). FIG. 6 depicts percent thermal expansion (TE) and coefficient of thermal expansion (CTE) for a composite material formed according to the present invention. As can be seen by comparing FIG. 5 with FIG. 6, the composite material has substantially less thermal expansion (e.g., less than about 0.2%) in a temperature range down to −320° F. compared to silicone compounds alone. Furthermore, the coefficient of thermal expansion for temperatures approaching −320° F. is similar to that of steel which has a thermal expansion coefficient at cryogenic temperatures of about $7 \times 10^{-6}$ inch/inch per ° F.

Furthermore, the composite material preferably has sufficient strength to accommodate the thermal-induced strains and pressure-induced strains created during a cryo-stretch cycle. The composite material according to one embodiment has a strength at cryogenic temperatures of at least about 17 ksi (about 120,000 kPa) in the hoop direction.

Preferably, the amount of elastomer used to wet the dry ceramic fabric is relatively small and is not sufficient to substantially increase the thickness of the composite material compared to the two layers of dry fabric. In the depicted example, the thickness of the composite material is preferably about 0.06 inches (about 1.5 millimeters). The small amount of elastomer trapped within the fabric does not crack or spall in the cryogenic environment. It is believed that this is at least partially because the elastomer is reinforced by ceramic fabric and has a very thin cross-sectional thickness.

After the insulation 10 is attached to the tank 32, the tank 32 is subjected to a cryo-stretch cycle by introducing pressurized cryogenic fluid into the interior of the tank, for example at a temperature of about −320° F. (−200° C.) and at a pressure of about 7,000 psi (about 50,000 kPa). The cryogenic fluid can be, for example, liquid nitrogen.

Following the cryo-stretch cycle, the insulated tank can be finished and placed in condition for use. When the tank is used as a propellant positive expulsion tank, it is exposed to pressurant gas, e.g., at a temperature of about 2000° F. (about 1100° C.) or more.

A Nextel fiber hemispherical bag with Inconel wire reinforcing hoops was formed as described above. The insulation was positioned adjacent the interior surface of a steel tank by mechanical connection using a retaining ring and a split ring cuff attachment. The dry ceramic fabric was wetted with RTV 560 at room temperature providing a composite material having a thickness of about 0.06 inches (about 1.5 millimeters) with a 0.10 inch (2.5 mm) elastomer bonding layer between the insulation and the tank and a 0.01 inch (0.25 mm) elastomer coating layer on the exposed surface of the insulation. Liquid nitrogen at a temperature of about −320° F. and a pressure of 7,000 psi (about 48,000 kPa) was introduced into the tank to perform a cryo-stretching cycle. The tank was tested for use as a positive expulsion tank and was found to operate satisfactorily during exposure to pressurant gasses of about 2000° F. (about 1100° C.).

In light of the above description, a number of advantages of the present invention can be seen. The present invention permits forming insulation for a tank which will be exposed to both cryogenic and elevated temperatures. The invention permits providing head insulation to a tank where the insulation must be installed in the interior of the tank before the cryogenic pressurization of the tank.

A number of variations and modifications of the invention can also be used. The insulation can be provided on external surfaces as well as internal surfaces. Coupling to the tank can be by mechanical attachment, by adhesion or by both. Insulation can be installed on other types of tank than steel tanks such as graphite epoxy or fiberglass/kevlar composites. Insulation can be positioned on tanks having shapes other than spherical or hemispherical shapes such as cylindrical, conical, planar or rectilinear surfaces and the like. Insulation can be positioned in situ rather than separately forming a free-standing insulation which is later positioned.

Although the invention has been described by way of a preferred embodiment and certain modifications and variations, other modifications and variations can also be used, the invention being defined by the following claims.

What is claimed is:

1. A method for insulating a tank for exposure to cryogenic and elevated temperature comprising:
   positioning a ceramic fiber fabric adjacent a surface of the tank;
   impregnating said fabric with a silicone elastomer to provide a composite material;
   vulcanizing said silicone elastomer; and
   cooling said tank and composite material to a cryogenic temperature by introducing pressurized cryogenic fluid.

2. A method, as claimed in claim 1, wherein said fabric comprises alumino-boro-silicate ceramic fibers.

3. A method, as claimed in claim 1, wherein said elastomeric is selected from the group consisting of methyl-phenyl silicone and dimethyl silicone.

4. A method, as claimed in claim 1, wherein said cryogenic temperature is less than about $-200°$ F.

5. A method, as claimed in claim 1, wherein said cryogenic temperature is about $-320°$ F.

6. A method, as claimed in claim 1, further comprising positioning a elastomer bonding layer between said ceramic fiber and a wall of the tank.

7. A method, as claimed in claim 1, further comprising providing an elastomer coating on the exposed surface of said insulation.

8. A method for insulating a tank for exposure to cryogenic and elevated temperatures comprising:
   positioning a ceramic fiber fabric adjacent a surface of the tank;
   impregnating said fabric with a silicone elastomer to provide a composite material;
   vulcanizing said silicone elastomer;
   cooling said tank and composite material to a cryogenic temperature by introducing pressurized cryogenic fluid; and
   heating at least a portion of said composite material during use of the insulated tank to a temperature of at least about $1000°$ F.

9. A method, as claimed in claim 8, wherein said cryogenic fluid is liquid nitrogen.

* * * * *